March 31, 1942.   J. L. HARRIS   2,278,402
CONTROL APPARATUS
Filed Nov. 7, 1938
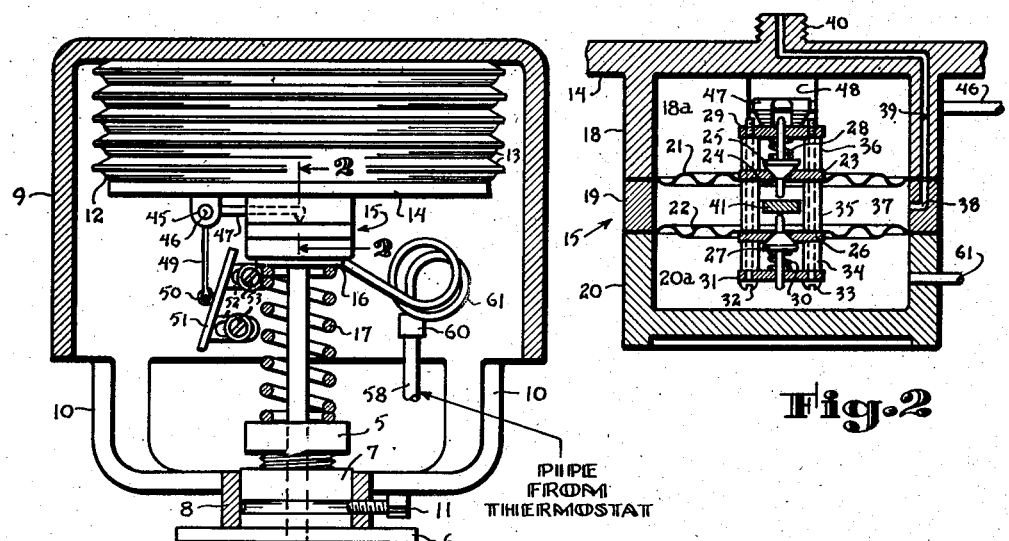
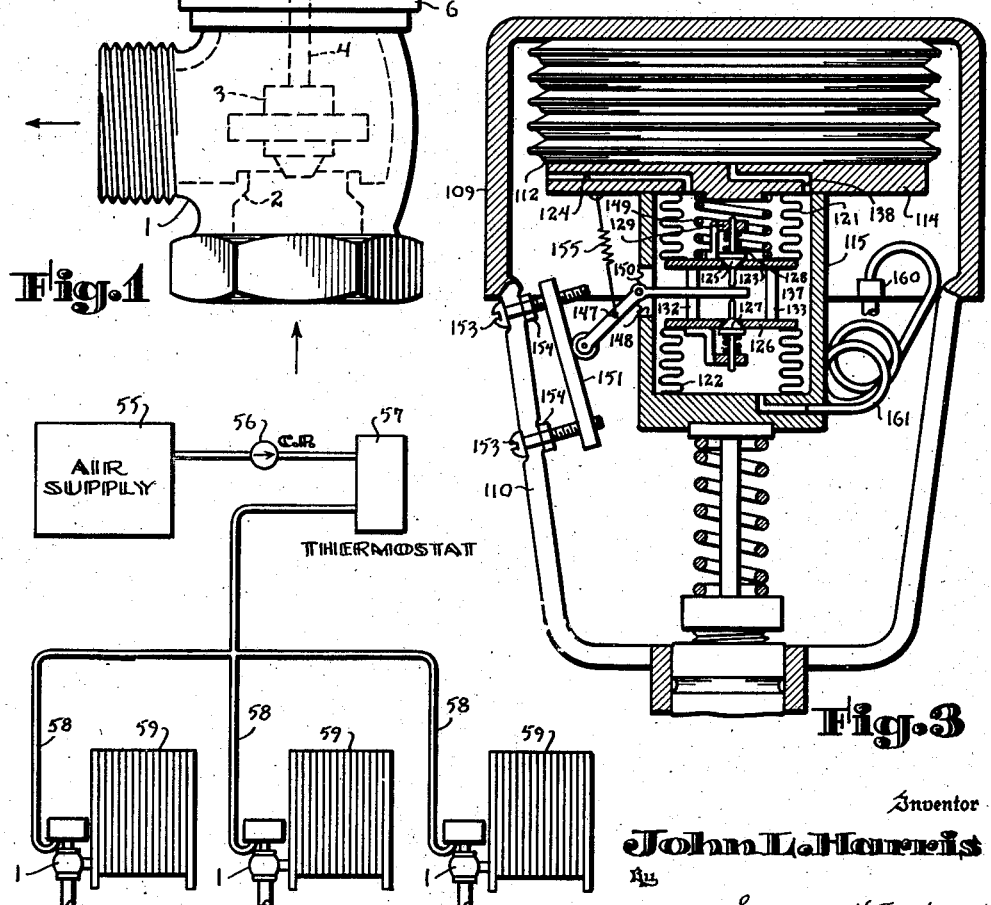
Inventor
John L. Harris
By
George H Fisher
Attorney Patented Mar. 31, 1942

2,278,402

UNITED STATES PATENT OFFICE 2,278,402

CONTROL APPARATUS

John L. Harris, Minneapolis, Minn., assignor to Minneapolis-Honeywell Regulator Company, Minneapolis, Minn., a corporation of Delaware Application November 7, 1938, Serial No. 239,332

10 Claims. (Cl. 121—41)

This invention relates in general to automatic controls and more particularly to automatic controls of the pneumatic or pressure actuated type.

In control apparatus of the pneumatic type, it has been customary to utilize motors for actuating valves or dampers which consist of a diaphragm biased in one direction by means of a spring. With this arrangement, as pressure is applied to the diaphragm, it expands against the biasing action of the spring. Hence, for each value of pressure applied to the diaphragm, there is a corresponding position which it will tend to assume. Thus by changing the pressure applied to the diaphragm of a motor of this type, the position of the damper or valve actuated thereby may be varied as desired. One defect of control apparatus of this type is that the power available for shifting the controlled device approaches zero as the controlled device approaches the desired position. This prevents the controlled device from ever reaching the exact position called for by the controller as there is no power available for overcoming the friction of the parts and the force exerted upon the controlled device by the medium being controlled. Another defect in the simple type of pneumatic motor is that there is no force available for holding the controlled device in the desired position. When the controlled device is in the proper position the force exerted by the biasing spring just balances the force caused by the pressure within the diaphragm. This permits movement of the controlled device rather easily due to the action of the fluid flowing through the valve or damper being controlled.

In order to overcome the objections to the simple type of pneumatic motor resort has been made to what is termed a positive positioner which consists of a valve mechanism for either supplying pressure fluid to the diaphragm or venting the diaphragm, this valve mechanism being controlled conjointly by the controller and a follow-up mechanism for thus causing the motor to assume the exact position called for by the controller irrespective of friction or load upon the controlled device. Such positive positioners, however, heretofore have been quite complicated and expensive in construction which has limited their use to expensive industrial control applications and has prohibited their use for controlling heating and ventilating of buildings. Such positive positioners also have required a supply of air under full pressure to the pneumatic motor being controlled which requires additional piping and adds to the expense of the installation.

It is an object of this invention to provide a positioning device for a pneumatic or pressure actuated motor which is simple and inexpensive in construction.

A further object of this invention is the provision of a positive positioning arrangement for pneumatic motors which requires only one air connection to each motor being controlled.

More specifically, it is an object of this invention to provide a pneumatic control system in which the position of the motor is positively controlled by a follow-up device under the control of a pneumatic condition controller, this controller maintaining an excess pressure in its control line which is utilized by the positive positioner for overcoming friction of the parts.

Another object of this invention is the provision of a small simple and compact positive positioner which may readily be applied to a radiator or similar pneumatic valve and which requires only a single pipe connection between the valve and thermostat or other controller.

A further object of this invention is the provision of a positive positioner for a pneumatic controller which consists of a pressure actuated valve assembly carried by the movable part of the motor, and which includes a follow-up member engaging a stationary part of the motor.

Other objects will appear from the following description and the appended claims.

For a full disclosure of this invention, reference is made to the following detailed description and to the accompanying drawing, in which Figure 1 indicates a pneumatic radiator valve partly in section and showing the positive positioner applied thereto;

Figure 2 is a section through the valve assembly taken on line 2—2 of Figure 1;

Figure 3 is a view similar to Figure 1 of a modified arrangement, and

Figure 4 diagrammatically indicates a pneumatic control system for controlling a plurality of valves having positioners embodying this invention.

Referring to Figure 1, reference character 1 indicates a radiator valve body of usual construction having a valve port 2 adapted for cooperation with a valve member 3 which is secured to a valve stem 4 leading upwardly through a stuffing box 5. The upper portion of the valve body 1 is covered by the usual bonnet 6 which is provided with a cylindrical portion 7 for receiving the annular base member 8 of the usual diaphragm cage 9. This diaphragm cage consists of an inverted cup member having integral legs 10 secured to the base portion 8. This base portion 8 is secured to the valve bonnet 6 by means of a lock screw 11. Located within the diaphragm cage 9 is the valve actuating diaphragm 12 which may consist of a plurality of communicating cells 13. The upper face of the top cell abuts the top of the diaphragm cage 9 and the lower cell 13 is mounted upon a base plate 14. Attached to this base plate 14 is a housing 15 which contains the valve assembly. This housing 15, in turn, rests upon a plate 16 which is secured to the valve stem 4. A biasing spring 17 is provided between the stuffing box member 5 and the valve housing 15 for thereby urging the diaphragm 12 towards contracted position and the valve member 3 away from the valve seat 2.

Referring to Figure 2, the valve housing 15 may be formed of an upper portion 18 which may be integral with the base plate 14, an intermediate annular portion 19, and a lower portion 20. Secured between the portions 18 and 19 is a diaphragm 21, and secured between the portions 19 and 20 is a diaphragm 22. The diaphragm 21 is provided with a central plate 23 into which is formed a valve port 24 which cooperates with a valve member 25. Similarly, the diaphragm 22 is provided with a plate 26 which is formed to provide a valve port cooperating with a valve member 27. The valve member 25 is urged against its seat by means of a spring 28 which abuts a cross member 29. This cross member 29 also acts as a guide for the valve member 25. The valve 27 is similarly biased to closed position by a spring 30 which abuts a cross member 31 which also acts as a valve guide. The cross members 29 and 31 are secured together by means of screws 32 and 33 which extend through suitable openings in the central plates 23 and 26. Suitable spacers 34, 35, and 36 are provided for maintaining the parts in the relative positions shown. It will be apparent that with the construction just described, the diaphragm 21 and 22 are joined together so as to move upwardly or downwardly in unison and that the valves 25 and 27 are biased towards closed position by the springs 28 and 30 irrespective of the positions of the diaphragms.

The chamber 37 between diaphragms 21 and 22 is connected by passages 38 and 39 in members 19 and 18 to a nipple 40 formed on the base plate 14. It will be understood that the lower cell 13 of the diaphragm 12 is attached to this nipple 40 and consequently the interior of this diaphragm is in constant communication with the space 37. Located within the space 37 and extending between the screws 32 and 33 is a stationary cross member 41 which is adapted to engage the valve members 25 and 27. When the diaphragms 21 and 22 are in the positions shown, the cross member 41 is not engaging either valve member and consequently these valve members are caused to engage their respective valve seats under the action of the biasing springs, thereby placing the chamber 37 and the interior of the diaphragm 12 out of communication with both the upper chamber 18a and the lower chamber 20a. Upon upward movement of the diaphragms 21 and 22, the valve member 27 will disengage its seat due to this member being held stationary by the cross member 41. Similarly, upon downward movement of the diaphragms, the cross member 41 will retain valve member 25 stationary thus causing it to disengage its seat.

Referring again to Figure 1, reference character 45 indicates lugs which may be formed integrally with the base plate 14 and which provide for rotatable mounting of a shaft 46. Attached to this shaft 46 is a follow-up member 47 which extends through an opening 48 and is provided with a forked end abutting the cross member 29. Also secured to the shaft 46 is a leaf spring member 49 which is rigidly connected at its upper end to the follow-up member 47 and which extends downwardly and carries a roller 50 which abuts an inclined plane member 51. This member may be adjustably secured to the sides of the diaphragm cage 9 by means of ears 52 and screws 53. The ears 52 are provided with slots receiving the screws 53 and these slots provide for shifting the member 51 to the right or left as well as varying the inclination thereof. It will be apparent that the tension of the spring member 49 due to engagement with the inclined plane member 51 will urge the follow-up member 47 downwardly which, in turn, will urge the diaphragms 21 and 22 downwardly.

Referring to Figure 4, reference character 55 indicates a source of air supply which may be connected through a reducing valve 56 to a thermostat 57. This thermostat in turn is connected by pipes 58 to the valves 1 which control the flow of heating medium into the radiators 59. The thermostat 57 may be of any desired type and is adapted to increase the pressure in the pipes 58 upon increase in temperature at the thermostat, while decreasing this pressure upon temperature fall. Referring again to Figure 1, the pipe 58 may be connected to a fitting 60 located within the interior of the diaphragm cage 9 and this fitting may be connected by a flexible tube 61 to the chamber 20a located beneath the diaphragm 22. In this manner, variable pressure applied by the thermostat 57 through pipe 58 is communicated to the space 20a thereby urging the diaphragms 21 and 22 upwardly.

From the foregoing description, it will be apparent that the variable pressure applied by the thermostat 57 tends to urge the assembly formed of diaphragms 21 and 22 upwardly, while the action of the spring member 49 and the follow-up member 47 urges this assembly downwardly. It will also be apparent that when the upward force exerted by diphragm 22 just balances the downward force of the spring member 49, the diaphragms 21 and 22 will assume the positions shown in which the valves 25 and 27 are closed. If the force exerted by the diaphragm or pressure actuated device 22 should become greater than the downward force exerted by the spring member 49, the diaphragm assembly will move upwardly for opening valve 27 and admitting pressure fluid from the thermostat to the space 37 and the diaphragm 12. On the other hand, if the downward force exerted by spring member 49 should become greater than the upward force exerted by the diaphragm 22, the diaphragm assembly will move downwardly for opening valve 25 which will permit pressure fluid to flow from the valve actuating diaphragm 12 to atmosphere.

The spring 17 which biases the valve member 3 towards open position may be so designed as to permit the valve to be entirely closed when the pressure in diaphragm 12 is at or above twelve pounds per square inch, while causing the valve member 3 to be in wide open position when the pressure in diaphragm 12 is at or below five pounds per square inch. The position of the inclined plane member 51 may be adjusted so that when the radiator valve is wide open the tension on the spring member 49 will just balance out a force of ten pounds per square inch beneath the diaphragm or pressure actuated device 22. This inclined plane member 51 may be also adjusted so that when the valve is completely closed, the tension of the spring member 49 just balances the force produced by diaphragm 22 when subjected to a pressure of seventeen pounds per square inch. The thermostat 57 may be adjusted so as to vary the pressure within pipes 58 between ten and seventeen pounds per square inch.

With the parts in the positions shown, the thermostat 57 has applied a force of approximately 13.5 pounds per square inch to the diaphragm 22. The valve is in approximately half open position and this has caused the spring member 49 to have a tension which just balances the force caused by the 13.5 pounds per square inch pressure applied beneath diaphragm 22. This has caused the diaphragm and valve assembly to assume the intermediate position in which valves 25 and 27 are closed. Consequently, no air is being supplied to or withdrawn from the diaphragm 12.

If the space temperature increases, the thermostat 57 will increase the pressure applied to diaphragm 22. This increase in pressure will cause the force exerted by this diaphragm to be greater than the opposing force of the spring member 49. Consequently, the diaphragm and valve assembly will shift upwardly which will cause opening of valve 27. This will permit the air in pipe 58 to flow through the connection 61 into chamber 20a and past valve member 27 into chamber 37 from which it flows through passages 38 and 39 into the motor diaphragm 12. This will cause expansion of the diaphragm 12 thereby causing downward movement of the valve stem 4 and of the entire valve assembly. As the valve stem moves downward for reducing the flow of heating medium to the radiator, the spring member 49 will be urged towards the left by the inclined plane member 51 thereby increasing its tension. When the increase in spring tension caused by downward movement of the valve stem 4 balances out the increase in pressure caused by thermostat 57, the diaphragms 21 and 22 will reassume the neutral position in which valve 27 is closed.

If the space temperature should decrease, the thermostat 57 will reduce the pressure in pipe 58 and consequently reduce the upward force exerted by diaphragm 22. This will permit downward movement of the diaphragm and valve assembly which will cause opening of valve 25. Opening of this valve will permit air within the motor diaphragm 12 to flow through passages 38 to 39 into chamber 37 and past valve 25 to atmosphere. This exhausting of air from the motor diaphragm 12 will permit the spring 17 to contract this diaphragm and urge the valve stem 4 upwardly for increasing the supply of heating medium to the radiator. As the valve steam 4 moves upwardly in this manner, the tension of spring member 49 will be decreased thereby decreasing the downward force applied by the follow-up member 47 upon the diaphragm and valve assembly. This will permit upward movement of this assembly towards the neutral position. When the valve movement corresponds to the change in pressure effected by thermostat 57, the force exerted by spring 49 will just balance the force exerted by diaphragm 22 and consequently the diaphragm and valve assembly will resume the neutral position for maintaining the valve stationary.

As mentioned before, the valve spring 17 may be designed so as to cause the radiator valve to be entirely closed when twelve pounds per square inch pressure is applied to diaphragm 12 while causing the valve to be wide open when this pressure is reduced to five pounds per square inch. Due to the adjustment of the inclined plane member 51 so as to cause complete opening of the valve when the pressure in pipe 58 is at ten pounds per square inch while causing the valve to be closed when the pressure is at seventeen pounds per square inch, there is always an excess pressure of five pounds per square inch in pipe 58 for overcoming a friction in the parts. Thus when the valve is wide open, a pressure of only slightly over five pounds per square inch will be necessary for overcoming the tension of spring 17 and closing the valve somewhat. At this time the pressure within the control line will be ten pounds per square inch and hence an excess pressure of five pounds per square inch is available for overcoming any tendency of the valve to stick and for insuring that the valve reaches the proper position. This excess pressure of five pounds per square inch is present throughout the entire control range. Thus only twelve pounds per square inch is necessary for holding the valve closed, and at this time a pressure of seventeen pounds per square inch will be present in the control line for insuring that the valve does close. Also, it will be seen that due to the spring 17 being designed for opening the valve wide with a pressure of five pounds per square inch in the diaphragm 12, this spring has an excess force corresponding to five pounds per square inch for insuring that the valve reaches wide open position, as the diaphragm 12 may be completely vented if necessary to obtain wide open position.

Referring now to Figure 3, this figure illustrates a modified follow-up arrangement. In this figure, the motor diaphragm 112 is located within the diaphragm cage 109 as in Figure 1. The base plate 114 which is secured to the lower cell of the diaphragm 112 is in turn secured to a casing 115 forming a chamber 137 which houses diaphragms 121 and 122, which in this case may be formed as bellows. The bellows or diaphragm 121 is secured to the base plate 114 and is provided with a head 123 formed to provide a valve seat for a valve member 125. This valve member is biased towards closed position by means of a spring 128 which abuts an angular member 129 secured to the head 123. This angular member also provides a guide for the valve 125. The diaphragm 122 is provided with a head 126 into which is formed a valve seat cooperating with a valve member 127. This valve member is biased towards closed position and guided similarly to the valve 125. The diaphragm 122 is secured to the lower part of the housing 115 and the interior thereof is connected by a passage to the flexible connection 161 which in turn is connected to the fitting 160. The thermostat pressure is therefore applied to the interior of diaphragm 122. The chamber 137 communicates through a passage 138 with the interior of the motor diaphragm 112. The interior of the diaphragm 121 is connected by a vent passage 124 to atmosphere.

The bellows or diaphragm heads 123 and 126 are secured together by means of members 132 and 133 for causing these diaphragms to move as a unit. Extending through an opening 146 in the side of member 115 is a follow-up member 147. This member is pivoted upon a sealing diaphragm 150 which covers the opening 148 and thus provides for sealing the chamber 137 from atmosphere. This follow-up member 147 is provided with a roller cooperating with an inclined plane member 151. This member may be adjustably secured to the leg 116 of the diaphragm cage by means of screws 153 which are provided with lock nuts 154. The follow-up member 147 is urged into engagement with the inclined plane member 151 by means of spring 155.

Located within the bellows or diaphragm 121 is a biasing spring 149. This spring abuts the base member 114 at its upper end and abuts the head 123 at its lower end. This provides a positive downward biasing of the diaphragm and valve assembly. Therefore for each value of pressure applied to the bellows 122, there will be a definite position assumed by the assembly formed of diaphragms 121 and 122. With the parts in the positions shown, a pressure of approximately 13.5 pounds per square inch is applied to the diaphragm 122 which causes the diaphragm and valve assembly within housing 115 to assume an intermediate position. This has caused the motor diaphragm 112 to assume an intermediate position in which the follow-up member 147 permits closing of valves 125 and 127.

If the space temperature should increase, the controlling thermostat will increase the pressure applied to diaphragm 122 which will cause upward movement of the diaphragm and valve assembly. At this time, the follow-up member 147 will remain stationary and consequently this upward movement will cause opening of valve 127. This will permit the flow of air under pressure into the motor diaphragm 112 for causing downward movement of the radiator valve stem and the entire assembly. This downward movement of the follow-up member 147 on the inclined plane member will cause it to rotate in a counter-clockwise direction thereby permitting valve 127 to approach its seat. When the movement of the radiator valve corresponds to the change in applied pressure caused by the thermostat, the follow-up member 147 will once again assume the neutral position in which the valves 127 and 125 are closed. It will be apparent that upon a decrease in pressure applied by the controlling thermostat, the diaphragm and valve assembly will move downwardly for causing opening of valve 125 thus venting the diaphragm 112 for permitting upward movement of the entire assembly. The follow-up member 147 in response to such movement will close valve 125 when the radiator valve movement corresponds to that demanded by the thermostat.

From the foregoing description, it will be apparent that this invention provides for positive positioning of a valve or other device in accordance with the demand of the controller, this result being obtained without the necessity of providing additional piping to the actuating motor. It will also be apparent that the invention provides a simple and compact positioning arrangement which may readily be applied to a standard radiator valve and which is entirely concealed. While the invention is of special utility for controlling a small device such as radiator valves, it will be understood that the invention is not limited to apparatus of this type and may be applied to other types of valves and also to damper motors. Also while definite values of pressure at which the device may respond have been given for illustrative purposes, it will be understood that these values may be varied as desired. As various modifications which are within the scope of this invention will occur to those skilled in the art, I desire to be limited only by the scope of the appended claims.

I claim as my invention:

1. In a pneumatic control system, in combination, a positioning motor means including a chamber having a movable wall, means including a control line for supplying pressure fluid to said motor means for actuating the same, condition responsive means for varying the pressure in said control line, a pressure actuated device connected to said control line, valve means in said control line actuated by said pressure actuated device for controlling the pressure supplied to the chamber of said motor means through said control line, and follow-up means actuated upon movement of said movable wall for cooperating with said pressure actuated device in controlling said valve means in a manner to cause said movable wall to follow up changes in pressure in said control line.

2. In a pneumatic control system, in combination, a positioning motor means including a chamber having a movable wall, means including a control line for supplying pressure fluid to said motor means for actuating the same, condition responsive means for varying the pressure in said control line, a pressure actuated device connected to said control line, three way valve means in said control line actuated by said pressure actuated device for controlling the pressure supplied to said chamber of said motor means through said control line, said valve means having a neutral position for closing off said chamber, a second position for placing said chamber in communication with atmosphere, and a third position for placing said chamber in communication with said control line, and follow-up means actuated upon movement of said movable wall for cooperating with said pressure actuated device in controlling said valve means in a manner to cause said movable wall position to follow up changes in pressure in said control line.

3. In a pneumatic control system, in combination, a positioning motor means including a chamber having a movable wall, a biasing means for said movable wall, said biasing means exerting a force varying with the position of said movable wall thereby tending to provide a predetermined position of said movable wall for each value of pressure applied to said chamber, means including a control line for supplying pressure fluid to said motor means for actuating the same, condition responsive means for varying the pressure in said control line, a pressure actuated device connected to said control line, valve means in said control line actuated by said pressure actuated device for controlling the pressure supplied to the chamber of said motor means through said control line, and follow-up means actuated upon movement of said movable wall for cooperating with said pressure actuated means in controlling said valve means in a manner to cause the movable wall position to follow up changes in pressure in said control line.

4. In a pneumatic control system, in combination, a positioning motor means including a chamber having a movable wall, a biasing means for said movable wall, said biasing means exerting a force varying with the position of said movable wall thereby tending to provide a predetermined position of said movable wall for each value of pressure applied to said chamber, means including a control line for supplying pressure fluid to said motor means for actuating the same, condition responsive means for varying the pressure in said control line, a pressure actuated device connected to said control line, three way valve means in said control line actuated by said pressure actuated device for controlling the pressure supplied to said chamber of said motor means through said control line, said valve means having a neutral position for closing off said chamber, a second position for placing said chamber in communication with atmosphere, and a third position for placing said chamber in communication with said control line, and follow-up means actuated upon movement of said movable wall for cooperating with said pressure actuated device in controlling said valve means in a manner to cause said movable wall position to follow up changes in pressure in said control line.

5. In a pneumatic control system, in combination, a positioning motor means including a chamber having a movable wall, a control line supplied with pressures depending on the value of a variable condition, a pressure actuated device connected to said control line, valve means actuated by said pressure actuated device for controlling the pressure applied to said chamber of said motor means, said valve means and said pressure actuated device being mounted in a manner to be shifted bodily as a unit upon movement of said movable wall, said valve means also being arranged to place said chamber into communication with said control line to thereby utilize the variable pressure fluid in said control line for actuating said motor means, and follow-up means for cooperating with said pressure actuated device in controlling said valve means to cause said movable wall position to follow up changes in pressure in said control line, said follow-up means including a follow-up member carried with said valve means and said pressure actuated means, said follow-up member engaging a stationary part of the system.

6. In a pneumatic control system, in combination, a positioning motor means including a chamber having a movable wall, a control line supplied with pressures depending on the value of a variable condition, a pressure actuated device connected to said control line, three way valve means actuated by said pressure actuated device for controlling the pressure applied to said chamber of said motor means, said valve means having a neutral position for closing off said chamber, a second position for placing said chamber in communication with atmosphere, and a third position for placing said chamber in communication with said control line for utilizing variable pressure fluid in the control line for actuating the motor means, said valve means and said pressure actuated device being mounted in a manner to be shifted bodily as a unit upon movement of said movable wall, and follow-up means for cooperating with said pressure actuated device in controlling said valve means to cause said movable wall position to follow up changes in pressure in said control line, said follow-up means including a follow-up member carried with said valve means and said pressure actuated means, said follow-up member engaging a stationary part of the system.

7. In a pneumatic control system, in combination, a positioning motor means including a chamber having a movable wall, a control line supplied with pressures depending on the value of a variable condition, a pressure actuated device connected to said control line, valve means actuated by said pressure actuated device for controlling the pressure applied to said chamber of said motor means, said valve means and said pressure actuated device being mounted in a manner to be shifted bodily as a unit upon movement of said movable wall, said valve means also being arranged to place said chamber into communication with said control line to thereby utilize the variable pressure fluid in said control line for actuating said motor means, and follow-up means for cooperating with said pressure actuated device in controlling said valve means to cause said movable wall position to follow-up changes in pressure in said control line, said follow-up means including a follow-up member carried with said valve means and said pressure actuated means, and a stationary but adjustable inclined plane member engaged by said follow-up member for causing motion of said follow-up member relative to said unit formed of said valve means and said pressure actuated device upon movement of said movable wall.

8. In a pneumatic control system, in combination, a positioning motor means including a chamber having a movable wall, a control line supplied with pressures depending on the value of a variable condition, a control unit including a pressure actuated device connected to said control line and valve means actuated by said pressure actuated device, said control unit being mounted for bodily movement with said movable wall, said valve means being arranged for placing said chamber in communication with said control line for thereby utilizing the variable pressure in said control line for actuating said motor means, and follow-up means for cooperating with said pressure actuated means in controlling said valve means, said follow-up means including a follow-up member carried by said unit, and a stationary but adjustable inclined plane member engaged by said follow-up member for causing motion of said follow-up member relative to said unit upon movement of said movable wall.

9. In a pneumatic control system, in combination, a positioning motor means for actuating said controlling device, said motor means including a chamber having a movable wall, a pressure control line, a control unit for said motor means including a pressure actuated device connected to said control line and valve means actuated by said pressure actuated device, said control unit being mounted for bodily movement with said movable wall, and follow-up means for cooperating with said pressure actuated means in controlling said valve means, said follow-up means including a follow-up member carried by said unit, and a stationary but adjustable inclined plane member engaged by said follow-up member for causing motion of said follow-up member relative to said unit upon movement of said movable wall.

10. In a pneumatic control system, in combination, a positioning motor means including a chamber having a movable wall, a biasing means for said movable wall, said biasing means exerting a force varying with the position of said movable wall thereby tending to provide a predetermined position of said movable wall for each value of pressure within a predetermined range of pressures applied to said chamber, means including a control line for supplying pressure fluid to said motor means for actuating the same, said control line being supplied with pressures within a predetermined range of pressures higher than the range of pressures necessary to actuate said movable wall through its range of movement against said biasing means, condition responsive means for varying the pressure in said control line, a pressure actuated device connected to said control line, valve means in said control line actuated by said pressure actuated device for controlling the pressure supplied to the chamber of said motor means through said control line, and follow-up means actuated upon movement of said movable wall for cooperating with said pressure actuated means in controlling said valve means in a manner to cause the movable wall position to follow up changes in pressure in said control line.

JOHN L. HARRIS.